US011935450B2

(12) United States Patent
Liu

(10) Patent No.: US 11,935,450 B2
(45) Date of Patent: Mar. 19, 2024

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventor: Jinfeng Liu, Shenzhen (CN)

( * ) Notice: Subject to any disclaimer, the term of this patent is extended or adjusted under 35 U.S.C. 154(b) by 0 days.

(21) Appl. No.: 17/438,429

(22) PCT Filed: Aug. 19, 2021

(86) PCT No.: PCT/CN2021/113440
§ 371 (c)(1),
(2) Date: Feb. 16, 2023

(87) PCT Pub. No.: WO2023/015590
PCT Pub. Date: Feb. 16, 2023

(65) Prior Publication Data

US 2024/0021119 A1 Jan. 18, 2024

(30) Foreign Application Priority Data

Aug. 9, 2021 (CN) ........................ 202110910448.7

(51) Int. Cl.
*G09G 3/20* (2006.01)

(52) U.S. Cl.
CPC ....... *G09G 3/20* (2013.01); *G09G 2310/0267* (2013.01); *G09G 2320/0233* (2013.01); *G09G 2320/0626* (2013.01); *G09G 2330/021* (2013.01)

(58) Field of Classification Search
CPC ............. G09G 3/20; G09G 2310/0267; G09G 2320/0233; G09G 2320/0626; G09G 2330/021
See application file for complete search history.

(56) References Cited

U.S. PATENT DOCUMENTS

| | | | | |
|---|---|---|---|---|
| 10,319,295 | B2 * | 6/2019 | Yin | G09G 3/3233 |
| 10,510,296 | B2 * | 12/2019 | Chen | G09G 3/3258 |
| 2018/0102097 | A1 * | 4/2018 | Cheng | G09G 3/342 |

FOREIGN PATENT DOCUMENTS

| | | | |
|---|---|---|---|
| CN | 105609053 | A | 5/2016 |
| CN | 107818759 | A | 3/2018 |
| CN | 107919092 | A | 4/2018 |
| CN | 110047435 | A | 7/2019 |
| CN | 209591496 | U | 11/2019 |
| CN | 112634818 | A | 4/2021 |
| KR | 20200068822 | A | 6/2020 |

OTHER PUBLICATIONS

International Search Report in International application No. PCT/CN2021/113440, dated Apr. 27, 2022.
Written Opinion of the International Search Authority in International application No. PCT/CN2021/113440, dated Apr. 27, 2022.

* cited by examiner

*Primary Examiner* — Lisa S Landis

(57) ABSTRACT

A display panel and a display device are provided. The display panel includes a display unit, the display unit includes a plurality of light emitting modules, and a driving circuit electrically connected to the display unit and drives the display unit to display. The driving circuit includes a first circuit module and a second circuit module, the second circuit module is electrically connected to the first circuit module and the display unit, respectively.

20 Claims, 3 Drawing Sheets

DISPLAY PANEL AND DISPLAY DEVICE

FIELD OF INVENTION

This disclosure relates to a field of display technology, and more particularly, to a display panel and a display device.

BACKGROUND OF INVENTION

With the rapid development of science and technology in today's society, electronic devices, such as mobile phones, computers and televisions are widely used in all aspects of life. Therefore, electronic display devices, such as liquid crystal display (LCD) and organic light emitting semiconductor (OLED) are widely used.

In a conventional thin film transistor liquid crystal display (TFT-LCD) device, when the TFT-LCD device is displaying images, it is necessary to use a gate driving circuit to scan a pixel unit. However, for the conventional TFT-LCD device, scanning signals will be attenuated with the transmission from a proximal end to a distal end. This causes a charging time in a middle area of the display device to be much shorter than that of a left end area and a right end area. That is, the brightness between the left end area, the right end area and the middle area of the display device is uneven.

A conventional method to improve the uneven charging problem is to change the phase of data signals and the scanning signals, and set the charging time of the pixel unit in each area of the TFT-LCD device corresponding to an optimal charging time, thereby improving the display effect. However, the above method does not fundamentally solve this problem, and it has its own limitations. The output data signal needs to be adjusted. Therefore, there are still problems, such as complicated adjustment processes and low efficiency.

SUMMARY OF INVENTION

Technical Problem

An object of the disclosure is to provide a display panel and a display device to effectively improve display uniformity and improve the display quality of the display panel.

Technical Solutions

In order to solve the above-mentioned drawbacks, the technical solutions provided by the disclosure are as follows.

The disclosure provides a display panel. The display panel comprises a display unit comprising a plurality of light emitting modules, a driving circuit electrically connected with the display unit and driving the display unit. The driving circuit comprises a first circuit module and a second circuit module, and the second circuit module is electrically connected to the first circuit module and the display unit, respectively. The first circuit module outputs a first electrical signal and a second electrical signal correspondingly to the second circuit module according to a default charging timing, and the second circuit module controls charging each of the light emitting modules based on the default charging timing according to the first electric signal and the second electric signal.

In the display panel of the embodiment of the disclosure, in one displaying frame period of the display panel, the default charging timing comprises at least a first charging period, a second charging period and a third charging period, and the second circuit module comprises:

a scanning signal adjustment output module electrically connected to the display unit;

a first adjustment sub-module electrically connected to the first circuit module and the scanning signal adjustment output module, respectively, wherein the first adjustment sub-module receives and is based upon the first electrical signal to adjust a first scanning signal outputted by the scanning signal adjustment output module corresponding to the first charging period; and a second adjustment sub-module electrically connected to the first circuit module and the scanning signal adjustment output module, respectively, wherein the second adjustment sub-module receives and is based upon the first electrical signal and the second electrical signal to adjust a second scanning signal and a third scanning signal which are outputted by the scanning signal adjustment output module and correspond to the second charging period and the third charging period.

In the display panel of the embodiment of the disclosure, the first adjustment sub-module comprises:

a first built-in power source;

a first control switch element, one closed terminal of the first control switch element is electrically connected to the scanning signal adjustment output module, and the other closed terminal of the first control switch element is electrically connected to the first built-in power source;

a voltage dividing element connected in series to the first built-in power source; and a first level identification module electrically connected to the first circuit module and a control terminal of the first control switch element, respectively, the first level identification module receives and is based upon the first electrical signal to switch a conduction state of the first control switch element to adjust the first scanning signal which is outputted by the scanning signal adjustment output module and corresponds to the first charging period.

In the display panel of the embodiment of the disclosure, the first electrical signal includes a first low level signal segment and a first high level signal segment corresponding to the first charging period, the first level identification module is configured to receive the first electrical signal and determine whether the first electrical signal changes from the first low level signal segment to the first high level signal segment.

When the first electrical signal changes from the first low level signal segment to the first high level signal segment, the first level identification module controls the conduction of the first control switch element to adjust the first scanning signal which is outputted by the scanning signal adjustment output module and corresponds to the first charging period.

In the display panel of the embodiment of the disclosure, the voltage dividing element comprises at least one first resistor, one end of the first resistor is connected to the first built-in power source, and the other end of the first resistor is connected to a grounding end.

In the display panel of the embodiment of the disclosure, the scanning signal adjustment output module comprises:

an output main circuit connected to the first adjustment sub-module;

a first adjustment switch element, wherein one closed terminal of the first adjustment switch element is connected to the output main circuit, the other closed terminal of the first adjustment switch element is input with a high potential signal, and a control terminal of the first adjustment switch element is connected to the second adjustment sub-module;

a second adjustment switch element, wherein one closed terminal of the second adjustment switch element is connected to the output main circuit, the other closed terminal of the second adjustment switch element is input with a first voltage, and a control terminal of the second adjustment switch element is connected to the second adjustment sub-module; and a shunt element connected to the second adjustment switch element in series.

The second adjustment sub-module receives and is based upon the first electrical signal and the second electrical signal to switch a conduction state of the first adjustment switch element and the second adjustment switch element to adjust the second scanning signal and the third scanning signal which are outputted by the scanning signal adjustment output module and correspond to the second charging period and the third charging period.

In the display panel of the embodiment of the disclosure, the shunt element comprises at least one second resistor, one end of the second resistor is connected to the first power source, and the other end of the second resistor is electrically connected to the second adjustment switch element.

In the display panel of the embodiment of the disclosure, the first electrical signal comprises a second high level signal segment corresponding to the second charging period and the third charging period, the second electrical signal comprises a third high level signal segment corresponding to the second charging period, and a second low level signal segment corresponding to the third charging period.

When the first electrical signal is the second high level signal segment and the second electrical signal is the third high level signal segment, the second adjustment sub-module controls the conduction of the first adjustment switch element to adjust the second scanning signal which is outputted by the scanning signal adjustment output module and corresponds to the second charging period.

When the first electrical signal is the second high level signal segment and the second electrical signal changes from the third high signal segment to the second low level signal segment, the second adjustment sub-module controls the conduction of the second adjustment switch element to adjust the third scanning signal which is outputted by the scanning signal adjustment output module and corresponds to the third charging period.

In the display panel of the embodiment of the disclosure, the second adjustment sub-module comprises:

a second built-in power source;

a second control switch element, wherein a control terminal of the second control switch element is electrically connected to the first circuit module, one closed terminal of the second control switch element is electrically connected to the control terminal of the first adjustment switch element, and the other closed terminal of the second control switch element is electrically connected to the second built-in power source; and a third control switch element, wherein a control terminal of the third control switch element is electrically connected to the first circuit module, one closed terminal of the third control switch element is electrically connected to the control terminal of the first adjustment switch element, the other closed terminal of the third control switch element is electrically connected to the second built-in power source, and the third control switch element is connected in series to the second control switch element.

When the first electrical signal is the second high level signal segment and the second electrical signal is the third high level signal segment, the second control switch element and the third control switch element are both turned on, the second control switch element and the third control switch element receive and are based upon a voltage of the second built-in power source to switch the conduction state of the first adjustment switching element to adjust the second scanning signal which is outputted by the scanning signal adjustment output module and corresponds to the second charging period.

In the display panel of the embodiment of the disclosure, the second adjustment sub-module comprises:

a third built-in power source;

a fourth control switch element, wherein a control terminal of the fourth control switch element is electrically connected to the first circuit module, one closed terminal of the fourth control switch element is electrically connected to the control terminal of the second adjustment switch element, and the other closed terminal of the fourth control switch element is electrically connected to the third built-in power source;

a fifth control switch element, wherein one closed terminal of the fifth control switch element is electrically connected to the control terminal of the second adjustment switch element, and the other closed terminal of the fifth control switch element is electrically connected to the third built-in power source, and the fifth control switch element is connected in series to the fourth control switch element; and a second level identification module respectively connected to the first circuit module and a control terminal of the fifth control switch element, wherein the second level identification module receives and is based upon the second electrical signal and switches the conduction state of the fifth control switching element.

When the first electrical signal is the second high level signal segment and the second electrical signal changes from the third high level signal segment to the second low level signal segment, the fourth control switch element and the fifth control switch element are turned on, the fourth control switching element and the fifth control switching element receive and are based upon a voltage of the third built-in power source to switch the conduction state of the second adjustment switching element to adjust the third scanning signal which is outputted by the scanning signal adjustment output module and corresponds to the third charging period.

In the display panel of the embodiment of the disclosure, the default charging timing further comprises a discharging period, and the scanning signal adjustment output module further comprises:

a third adjustment switch element, wherein one closed terminal of the third adjustment switch element is connected to the output main circuit, the other closed terminal of the third adjustment switch element is input with a low potential signal, and a control terminal of the third adjustment switch element is connected to the second adjustment sub-module.

The second adjustment sub-module receives and is based upon the first electrical signal and the second electrical signal, to switch a conduction state of the third adjustment switch element to adjust a fourth scanning signal which is output by the scanning signal adjustment output module and corresponds to the discharging period.

In the display panel of the embodiment of the disclosure, the first electrical signal further comprises a third low level signal segment corresponding to the discharging period, and the second adjustment sub-module comprises:

a fourth built-in power source;

a sixth control switch element, wherein a control terminal of the sixth control switch element is electrically connected to the first circuit module, and one closed terminal of the sixth control switch element is electrically connected to the control terminal of the third adjustment switch element, the other closed terminal of the sixth control switch element is electrically connected to the fourth built-in power source;

a seventh control switch element, wherein the control terminal of the seventh control switch element is electrically connected to the first circuit module, and one closed terminal of the seventh control switch element is electrically connected to the control terminal of the third adjustment switch element, the other closed terminal of the seventh control switch element is electrically connected to the fourth built-in power source, and the seventh control switch element is connected in series to the sixth control switch element.

When the first electrical signal is the third low level signal segment and the second electrical signal is the second low level signal segment, the sixth control switch element and the seventh control switch element are both turned on, the sixth control switch element and the seventh control switch element receive and are based upon a voltage of the fourth built-in power source to switch the conduction state of the third adjustment switch element to adjust the fourth scanning signal which is output by the scanning signal adjustment output module and corresponds to the discharging period.

In the display panel of the embodiment of the disclosure, the plurality of light emitting modules comprise at least one target light emitting module, and the default charging timing is an actual charging timing of the target light emitting module under a test data signal, and a brightness value of the target light emitting module under the test data signal is less than or equal to a brightness value of any of the light emitting modules under the test data signal.

Accordingly, the disclosure further provides a display device. The display device comprises a display panel, the display panel comprises:

a display unit comprising a plurality of light emitting modules;

a driving circuit electrically connected with the display unit and driving the display unit, wherein the driving circuit comprises a first circuit module and a second circuit module, and the second circuit module electrically connected to the first circuit module and the display unit, respectively.

The first circuit module outputs a first electrical signal and a second electrical signal correspondingly to the second circuit module according to a default charging timing, and the second circuit module controls charging each of the light emitting modules based on the default charging timing according to the first electric signal and the second electric signal.

In the display device of the embodiment of the disclosure, in one displaying frame period of the display panel, the default charging timing comprises at least a first charging period, a second charging period and a third charging period, and the second circuit module comprises:

a scanning signal adjustment output module electrically connected to the display unit;

a first adjustment sub-module electrically connected to the first circuit module and the scanning signal adjustment output module, respectively, and the first adjustment sub-module receives and is based upon the first electrical signal to adjust a first scanning signal outputted by the scanning signal adjustment output module corresponding to the first charging period; and a second adjustment sub-module electrically connected to the first circuit module and the scanning signal adjustment output module, respectively, and the second adjustment sub-module receives and is based upon the first electrical signal and the second electrical signal to adjust a second scanning signal and a third scanning signal which are outputted by the scanning signal adjustment output module and correspond to the second charging period and the third charging period.

In the display device of the embodiment of the disclosure, the first adjustment sub-module comprises:

a first built-in power source;

a first control switch element, wherein one closed terminal of the first control switch element is electrically connected to the scanning signal adjustment output module, and the other closed terminal of the first control switch element is electrically connected to the first built-in power source;

a voltage dividing element connected in series to the first built-in power source; and a first level identification module electrically connected to the first circuit module and a control terminal of the first control switch element, respectively. The first level identification module receives and is based upon the first electrical signal to switch a conduction state of the first control switch element to adjust the first scanning signal which is outputted by the scanning signal adjustment output module and corresponds to the first charging period.

In the display device of the embodiment of the disclosure, the first electrical signal includes a first low level signal segment and a first high level signal segment corresponding to the first charging period, the first level identification module is configured to receive the first electrical signal and determine whether the first electrical signal changes from the first low level signal segment to the first high level signal segment. When the first electrical signal changes from the first low level signal segment to the first high level signal segment, the first level identification module controls the conduction of the first control switch element to adjust the first scanning signal which is outputted by the scanning signal adjustment output module and corresponds to the first charging period.

In the display device of the embodiment of the disclosure, the voltage dividing element comprises at least one first resistor, one end of the first resistor is connected to the first built-in power source, and the other end of the first resistor is connected to a grounding end.

In the display device of the embodiment of the disclosure, the scanning signal adjustment output module comprises:

a output main circuit connected to the first adjustment sub-module;

a first adjustment switch element, and one closed terminal of the first adjustment switch element is connected to the output main circuit, the other closed terminal of the first adjustment switch element is input with a high potential signal, and a control terminal of the first adjustment switch element is connected to the second adjustment sub-module;

a second adjustment switch element, and one closed terminal of the second adjustment switch element is connected to the output main circuit, the other closed terminal of the second adjustment switch element is input with a first voltage, and a control terminal of the second adjustment switch element is connected to the second adjustment sub-module; and a shunt element connected to the second adjustment switch element in series.

The second adjustment sub-module receives and is based upon the first electrical signal and the second electrical signal, to switch a conduction state of the first adjustment switch element and the second adjustment switch element to adjust the second scanning signal and the third scanning signal which are outputted by the scanning signal adjustment output module and correspond to the second charging period and the third charging period.

In the display device of the embodiment of the disclosure, the shunt element comprises at least one second resistor, one end of the second resistor is connected to the first power source, and the other end of the second resistor is electrically connected to the second adjustment switching element.

Beneficial Effects

The application provides a display panel and a display device. The display panel comprises a display unit. The display unit comprises a plurality of light emitting modules, and a driving circuit electrically connected with the display unit and driving the display unit. The driving circuit comprises a first circuit module and a second circuit module. The second circuit module is electrically connected to the first circuit module and the display unit, respectively. The first circuit module outputs a first electrical signal and a second electrical signal correspondingly to the second circuit module according to a default charging timing, and the second circuit module controls charging each of the light emitting modules based on the default charging timing according to the first electric signal and the second electric signal. Therefore, the display brightness of each of the light emitting modules is the same, thereby improving the charging uniformity of the display panel and enhancing the display effect of the display panel.

DETAILED DESCRIPTION OF PREFERRED EMBODIMENTS

The disclosure provides a display panel and a display device. In order to make the objects, technical solutions and effects of the disclosure more clear and definite, the disclosure is further described in detail below with reference to the drawings in the embodiments of the disclosure. It should be understood that the description of the specification should not be interpreted as a limitation to this disclosure.

Figure 1:
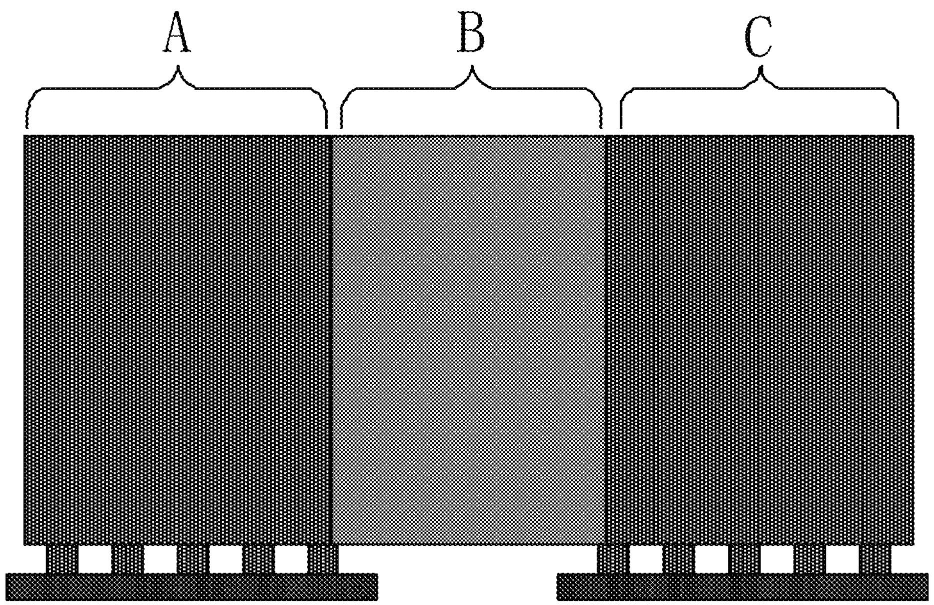
FIG. 1 is a schematic diagram of a charging effect of a conventional display panel.

Referring to FIG. 1, a schematic diagram of a charging effect of a conventional display panel is shown.

In a conventional display panel, when a pixel unit is charged, the pixel unit needs to be scanned by a gate driving circuit. However, in the actual charging process, the scanning signal will be attenuated with the transmission from a proximal end to a distal end, which causes the charging time in a middle area of the display panel is much less than that in a left end area and a right end area. That is, the brightness between the left end area, the right end area and the middle area of the display device is uneven, as shown in an area A, an area B and an area C in FIG. 1. A conventional method to improve the uneven charging problem is to change the phase of data signals and the scanning signals, and set the charging time of the pixel unit in each area of the display panel to approach an optimal charging time, thereby improving the display effect. However, the above method does not fundamentally solve this problem, and it has its own limitations. The output data signal needs to be adjusted. Therefore, there are still problems such as complicated adjustment process and low efficiency. Based on this, the disclosure provides a display panel and a display device to solve the above-mentioned problems Referring to FIG. 1 to FIG. 5, the disclosure provides a display panel, the display panel comprises a display unit 10, and the display unit 10 comprises:

a plurality of light emitting modules 100; and a driving circuit electrically connected with the display unit 10 and driving the display unit 10. The driving circuit comprises a first circuit module 30 and a second circuit module 20, and the second circuit module 20 is electrically connected to the first circuit module 30 and the display unit 10, respectively.

The first circuit module 30 outputs a first electrical signal CTL and a second electrical signal FLK correspondingly to the second circuit module 20 according to a default charging timing, and the second circuit module 20 controls charging each of the light emitting modules 100 based on the default charging timing according to the first electric signal CTL and the second electric signal FLK, so that the display brightness of each of the light emitting modules 100 is the same.

It should be noted that the first circuit module 30 includes but is not limited to a timing control module, the second circuit module 20 includes but is not limited to a signal adjustment module, the first electrical signal CTL is a control signal, and the second electrical signal FLK is a logic signal, which is not limited in the disclosure.

In this disclosure, the first circuit module 30 outputs the corresponding first electric signal CTL and second electric signal FLK to the second circuit module 20 according to a default charging timing, and the second circuit module 20 controls charging each light emitting module 100 based on the default charging timing according to the first electric signal CTL and the second electric signal FLK. The charging timing of the light emitting module 100 at the proximal end and distal end of the display panel is the same. That is to say, the charging time of each of the light emitting modules 100 on the display panel is the same, so that the display brightness of each I of the light emitting modules 100 is the same, and the brightness uniformity of the display panel is improved.

The technical solutions of the disclosure are described in combination with specific embodiments.

Figure 2:
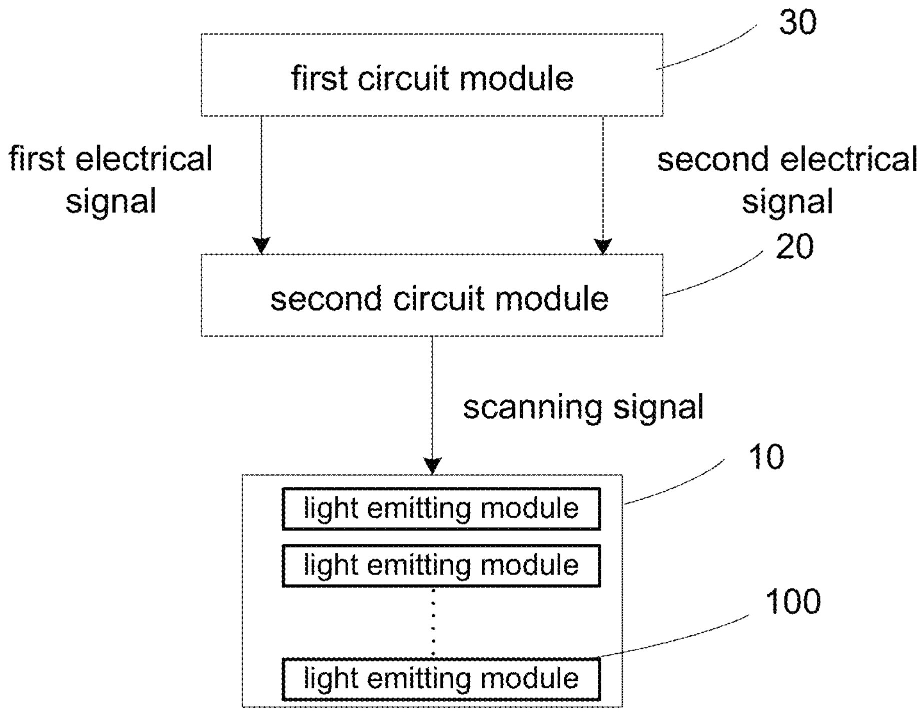
FIG. 2 is an exemplary schematic diagram of a display panel according to an embodiment of the disclosure.

Referring to FIG. 2, an exemplary schematic diagram of a display panel according to an embodiment of the disclosure is shown.

In this embodiment, the disclosure provides a display panel. The display panel comprises a display unit 10, and the display unit 10 comprises a plurality of light emitting modules 100, and a driving circuit electrically connected with the display unit 10 and driving the display unit 10. The driving circuit comprises a first circuit module 30 and a second circuit module 20, and the second circuit module 20 is electrically connected to the first circuit module 30 and the display unit 10, respectively.

The first circuit module 30 outputs a first electrical signal CTL and a second electrical signal FLK correspondingly to the second circuit module 20 according to a default charging timing, and the second circuit module 20 controls charging each of the light emitting modules 100 based on the default charging timing according to the first electric signal CTL and the second electric signal FLK, so that the display brightness of each of the light emitting modules 100 is the same.

It should be noted that the first circuit module 30 includes but is not limited to a timing control module, the second circuit module 20 includes but is not limited to a signal adjustment module, the first electrical signal CTL is a control signal, and the second electrical signal FLK is a logic signal, which is not limited in the disclosure.

It can be understood that, in this embodiment, the first circuit module 30 is a timing control module, the second circuit module 20 is a signal adjustment module, the first electrical signal CTL is a control signal, and the second electrical signal is FLK is a logic signal as an example for description.

In this embodiment, by providing the second circuit module 20, the first circuit module 30 outputs the corresponding first electric signal CTL and second electric signal FLK to the second circuit module 20 according to a default charging timing, and the second circuit module 20 controls charging each light emitting module 100 based on the default charging timing according to the first electric signal CTL and the second electric signal FLK. The display brightness of each of the light emitting modules 100 is the same, so as to improve the charging uniformity of the display panel and improve the display effect of the display panel.

Figure 3:
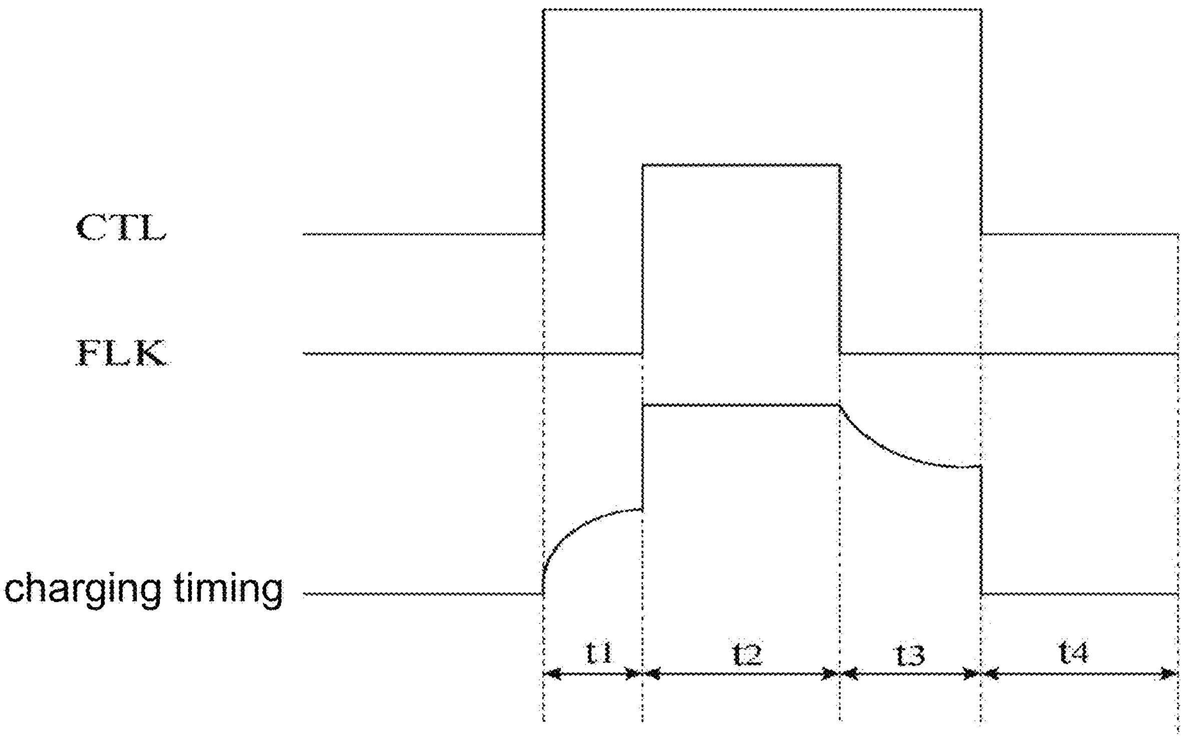
FIG. 3 is a schematic diagram of a charging timing for one frame of a display panel according to an embodiment of the disclosure.
Figure 4:
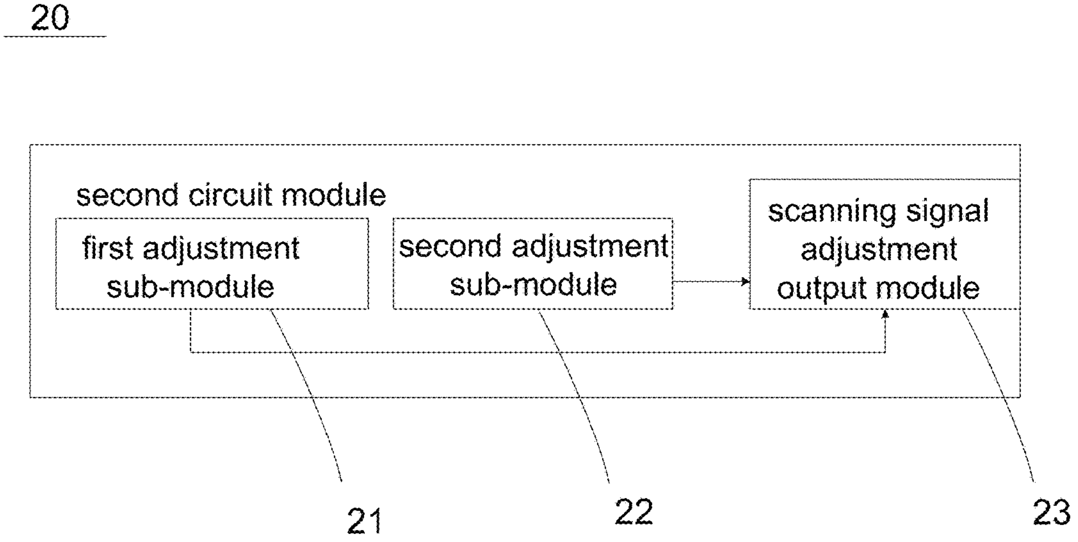
FIG. 4 is a schematic diagram of a planar structure of the display panel according to an embodiment of the disclosure.
Figure 5:
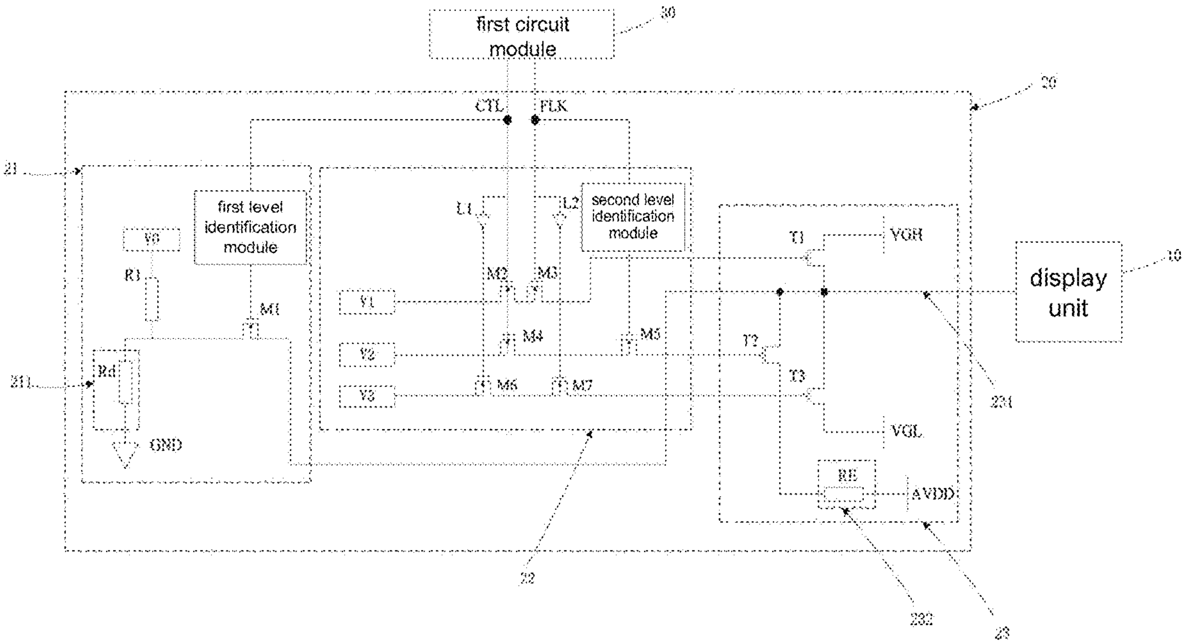
FIG. 5 is a schematic diagram of a plan structure of a second circuit module according to an embodiment of the disclosure.

Specifically, referring to FIG. 3, FIG. 4, and FIG. 5, a schematic diagram of a charging timing for one frame of a display panel according to an embodiment of the disclosure is shown in FIG. 3, a schematic diagram of a planar structure of the display panel according to an embodiment of the disclosure is shown in FIG. 4, and a schematic diagram of a plan structure of a second circuit module according to an embodiment of the disclosure is shown in FIG. 5.

In this embodiment, in one displaying frame period of the display panel, the default charging timing comprises at least a first charging period t1, a second charging period t2 and a third charging period t3. The second circuit module 20 comprises: a scanning signal adjustment output module 23 electrically connected to the display unit 10, a first adjustment sub-module 21 electrically connected to the first circuit module 30 and the scanning signal adjustment output module 23, respectively, the first adjustment sub-module 21 receives and is based upon the first electrical signal CTL to adjust a first scanning signal outputted by the scanning signal adjustment output module 23 corresponding to the first charging period t1, and a second adjustment sub-module 22 electrically connected to the first circuit module 30 and the scanning signal adjustment output module 23, respectively, the second adjustment sub-module 22 receives and is based upon the first electrical signal CTL and the second electrical signal FLK to adjust a second scanning signal and a third scanning signal which are outputted by the scanning signal adjustment output module and correspond to the second charging period t2 and the third charging period t3.

Moreover, the first adjustment sub-module 21 comprises a first built-in power source V0, a first control switch element M1, a voltage dividing element 211 connected in series to the first built-in power source V0, and a first level identification module electrically connected to the first circuit module 30 and a control terminal of the first control switch element M1, respectively. One closed terminal of the first control switch element M1 is electrically connected to the scanning signal adjustment output module 23, and the other closed terminal of the first control switch element M1 is electrically connected to the first built-in power source V0. The first level identification module receives and is based upon the first electrical signal CTL to switch a conduction state of the first control switch element M1 to adjust the first scanning signal which is outputted by the scanning signal adjustment output module 23 and corresponds to the first charging period t1.

Specifically, the first electrical signal CTL includes a first low level signal segment and a first high level signal segment corresponding to the first charging period t1, the first level identification module is configured to receive the first electrical signal CTL and determine whether the first electrical signal CTL changes from the first low level signal segment to the first high level signal segment.

When the first electrical signal CTL changes from the first low level signal segment to the first high level signal segment, the first level identification module controls the conduction of the first control switch element M1 to adjust the first scanning signal which is outputted by the scanning signal adjustment output module 23 and corresponds to the first charging period t1.

In this embodiment, the voltage dividing element 211 comprises at least one first resistor Rd, one end of the first resistor Rd is connected to the first built-in power source V0, and the other end of the first resistor Rd is connected to a grounding end GND. Besides, the first resistor Rd is an adjustable resistor with adjustable resistance. By providing the voltage dividing element 211, the voltage dividing element 211 at least includes the first resistor Rd. By adjusting the resistance value of the first resistor Rd, the voltage signal output by the first built-in power source V0 of the first adjustment sub-module 21 can be adjusted, thereby adjusting the scanning signal adjustment output module 23 to output the first scanning signal corresponding to the first charging period t1, and then adjusting the charging timing of the first charging period t1. It can be realized that the charging timing of the plurality of light emitting modules 100 in the first charging period t1 is the same, and, that is, the charging time is the same.

In this embodiment, the first adjustment sub-module 21 also includes a protection resistor R1 connected in series with the first built-in power source V0, and the protection resistor R1 is arranged between the first built-in power source V0 and the first control switch element M1, thereby providing the effect of circuit protection.

It can be understood that the voltage of the first built-in power source V0 and the resistance of the protection resistor R1 can be selected according to the actual situation. In this embodiment, the voltage of the first built-in power source V0 and the resistance of the protection resistor R1 are not further limited.

It should be noted that the first charging period t1 is a pre-charging period of the light emitting module 100. In the actual charging process, the voltage of the light emitting module 100 fluctuates greatly, the time for charging the light emitting module to rise to a required voltage is longer. Therefore, the light emitting module 100 is precharged, so as to reduce the charging time of the light emitting module 100.

In this embodiment, the scanning signal adjustment output module 23 comprises an output main circuit 231 connected to the first adjustment sub-module 21, a first adjustment switch element T1, a second adjustment switch element T2, and a shunt element 232 connected to the second adjustment switch element T2 in series. One closed terminal of the first adjustment switch element T1 is connected to the output main circuit 231, the other closed terminal of the first adjustment switch element T1 is input with a high potential signal VGH, and a control terminal of the first adjustment switch element T1 is connected to the second adjustment sub-module 22. One closed terminal of the second adjustment switch element T2 is connected to the output main circuit 231, the other closed terminal of the second adjustment switch element T2 is input with a first voltage AVDD, and a control terminal of the second adjustment switch element T2 is connected to the second adjustment sub-module 22. The second adjustment sub-module 22 receives and is based upon the first electrical signal CTL and the second electrical signal FLK to switch a conduction state of the first adjustment switch element T1 and the second adjustment switch element T2 to adjust the second scanning signal and the third scanning signal which are outputted by the scanning signal adjustment output module 23 and correspond to the second charging period t2 and the third charging period t3.

In this embodiment, the first electrical signal CTL comprises a second high level signal segment corresponding to the second charging period t2 and the third charging period t3, the second electrical signal FLK comprises a third high level signal segment corresponding to the second charging period t2, and a second low level signal segment corresponding to the third charging period t3.

When the first electrical signal CTL is the second high level signal segment and the second electrical signal FLK is the third high level signal segment, the second adjustment sub-module 22 controls the conduction of the first adjustment switch element T1 to adjust the second scanning signal which is outputted by the scanning signal adjustment output module 23 and corresponds to the second charging period t2.

Moreover, the second adjustment sub-module 22 comprises a second built-in power source V1, a second control switch element M2, and a third control switch element M3. A control terminal of the second control switch element M2 is electrically connected to the first circuit module 30, one closed terminal of the second control switch element M2 is electrically connected to the control terminal of the first adjustment switch element T1, and the other closed terminal of the second control switch element M2 is electrically connected to the second built-in power source V1. A control terminal of the third control switch element M3 is electrically connected to the first circuit module 30, one closed terminal of the third control switch element M3 is electrically connected to the control terminal of the first adjustment switch element T1, the other closed terminal of the third control switch element M3 is electrically connected to the second built-in power source V1, and the third control switch element M3 is connected in series to the second control switch element M2.

Besides, when the first electrical signal CTL is the second high level signal segment and the second electrical signal FLK is the third high level signal segment, the second control switch element M2 and the third control switch element M3 are both turned on, the second control switch element M2 and the third control switch element M3 receive is based upon a voltage of the second built-in power source V2 to switch the conduction state of the first adjustment switching element T1 to adjust the second scanning signal FLK which is outputted by the scanning signal adjustment output module 23 and corresponds to the second charging period t2. The second electrical signal FLK is adjusted to control the charging time of the second scanning signal, thereby adjusting the charging timing of the second charging period t2. It can be realized that the charging timing of the plurality of light emitting modules 100 in the second charging period t2 is the same. That is, the charging time is the same.

When the first electrical signal CTL is the second high level signal segment and the second electrical signal FLK changes from the third high signal segment to the second low level signal segment, the second adjustment sub-module 22 controls the conduction of the second adjustment switch element T2 to adjust the third scanning signal which is outputted by the scanning signal adjustment output module 23 and corresponds to the third charging period t3.

Furthermore, the second adjustment sub-module 22 comprises a third built-in power source V2, a fourth control switch element M4, a fifth control switch element M5, and a second level identification module. A control terminal of the fourth control switch element M4 is electrically connected to the first circuit module 30, one closed terminal of the fourth control switch element M4 is electrically connected to the control terminal of the second adjustment switch element T2, and the other closed terminal of the fourth control switch element M4 is electrically connected to the third built-in power source V2. One closed terminal of the fifth control switch element M5 is electrically connected to the control terminal of the second adjustment switch element T2, and the other closed terminal of the fifth control switch element is electrically connected to the third built-in power source V2, and the fifth control switch element M5 is connected in series to the fourth control switch element M4. The second level identification module is respectively connected to the first circuit module 30 and a control terminal of the fifth control switch element M5, and the second level identification module receives and is based upon the second electrical signal FLK and switches the conduction state of the fifth control switching element M5.

When the first electrical signal CTL is the second high level signal segment and the second electrical signal FLK changes from the third high level signal segment to the second low level signal segment, the fourth control switch element M4 and the fifth control switch element M5 are turned on. The fourth control switching element M4 and the fifth control switching element M5 receive and are based upon a voltage of the third built-in power source V2 to switch the conduction state of the second adjustment switching element T2 to adjust the third scanning signal which is outputted by the scanning signal adjustment output module 23 and corresponds to the third charging period t3.

In this embodiment, the shunt element 232 at least includes a second resistor RE, one end of the second resistor RE is connected to the first power supply AVDD, and the other end of the second resistor RE is electrically connected to the second adjustment switch element T2. By adjusting the resistance value of the second resistor RE, the scanning signal adjustment output module 23 can be adjusted to output the third scanning signal corresponding to the third charging period t3, thereby adjusting the third charging period t3. It can be realized that the charging timing of the plurality of light emitting modules 100 in the third charging period t3 is the same. That is, the charging time is the same.

It can be understood that in this embodiment the number of the first resistor RD and the second resistor RE are not specifically limited.

Besides, in this embodiment, the default charging timing further comprises a discharging period t4. The scanning signal adjustment output module 23 further comprises a third adjustment switch element T3. One closed terminal of the third adjustment switch element T3 is connected to the output main circuit 231, the other closed terminal of the third adjustment switch element T3 is input with a low potential signal VGL, and a control terminal of the third adjustment switch element T3 is connected to the second adjustment sub-module 22.

Moreover, the second adjustment sub-module 22 receives and is based upon the first electrical signal CTL and the second electrical signal FLK, to switch a conduction state of the third adjustment switch element T3 to adjust a fourth scanning signal which is output by the scanning signal adjustment output module 23 and corresponds to the discharging period t4.

It should be noted that the first charging period t1, the second charging period t2, the third charging period t3 and the discharging period t4 are continuous time periods.

Specifically, the first electrical signal CTL further comprises a third low level signal segment corresponding to the discharging period t4. The second adjustment sub-module 22 comprises a fourth built-in power source V3, a sixth control switch element M6, and a seventh control switch element M7. A control terminal of the sixth control switch element M6 is electrically connected to the first circuit module 30, one closed terminal of the sixth control switch element M6 is electrically connected to the control terminal of the third adjustment switch element T3, and the other closed terminal of the sixth control switch element M6 is electrically connected to the fourth built-in power source V3. The control terminal of the seventh control switch element M7 is electrically connected to the first circuit module 30, one closed terminal of the seventh control switch element M7 is electrically connected to the control terminal of the third adjustment switch element T3, the other closed terminal of the seventh control switch element M7 is electrically connected to the fourth built-in power source V3, and the seventh control switch element M7 is connected in series to the sixth control switch element M6.

When the first electrical signal CTL is the third low level signal segment and the second electrical signal FLK is the second low level signal segment, the sixth control switch element M6 and the seventh control switch element M7 are both turned on. The sixth control switch element M6 and the seventh control switch element M7 receive and are based upon a voltage of the fourth built-in power source V3 to switch the conduction state of the third adjustment switch element T3 to adjust the fourth scanning signal which is output by the scanning signal adjustment output module 23 and corresponds to the discharging period t4.

Further, in this embodiment, the second adjustment sub-module 22 further includes a first inverter L1 and a second inverter L2. A control terminal of the sixth control switching element M6 inputs the third low level signal segment through the first inverter L1, a control terminal of the seventh control switch element M7 inputs the second low level signal segment through the second inverter L2.

It should be noted that the first control switch element M1, the second control switch element M2, the third control switch element M3, the fourth control switch element M4, the fifth control switch element M5, Both the sixth control switch element and the seventh control switch element M7 all include but are not limited to MOSFETs, which are not further limited in this embodiment.

It should be noted that the first adjustment switch element T1, the second adjustment switch element T2, and the third adjustment switch element T3 all include, but are not limited to, thin film transistors, which are not specifically limited in this embodiment.

It can be understood that the second built-in power source V1, the third built-in power source V2 and the fourth built-in power source V3 can be selected according to the actual requirements, which is not specifically limited in this embodiment. Meanwhile, the second built-in power source V1, the third built-in power source V2 and the fourth built-in power source V3 can be provided by the same built-in power source, which will not be described herein.

In this embodiment, by adjusting the resistance value of the first resistor Rd, the voltage signal output by the first built-in power source V0 of the first adjustment sub-module 21 can be adjusted, thereby adjusting the scanning signal adjustment output module 23 to output the first scanning signal corresponding to the first charging period t1, and further adjusting the charging timing of the first charging period t1. It can be realized that the charging timing of the plurality of light emitting modules 100 in the first charging period t1 is the same. The charging time of the second scanning signal is controlled by adjusting the second electrical signal FLK, and the charging timing of the second charging period t2 is adjusted. It can be realized that the charging timing of the plurality of light emitting modules 100 in the second charging period t2 is the same. By adjusting the resistance value of the second resistor RE, the scanning signal adjustment output module 23 can be adjusted to output the third scanning signal corresponding to the third charging period t3, thereby adjusting the charging timing of the third charging period t3. It can be realized that the charging timing of the plurality of light emitting modules 100 in the third charging period t3 is the same. Obviously, in this embodiment, the second electrical signal FLK, the first resistor Rd, and the second resistor RE are adjusted to adjust the charging timing of a plurality of the light emitting modules 100, so that the charging timing of the light emitting modules 100 at the proximal end and distal end of the display panel is the same. That is to say, the charging time of each of the light emitting modules 100 on the display panel is the same, so that the display brightness of each light emitting module 100 is the same, and the brightness uniformity of the display panel is improved.

It should be noted that in this embodiment, the plurality of light emitting modules 100 comprise at least one target light emitting module. The default charging timing is an actual charging timing of the target light emitting module under a test data signal, and a brightness value of the target light emitting module under the test data signal is less than or equal to a brightness value of any of the light emitting modules under the test data signal. The actual charging timing of the target light emitting module under the test data signal is set as the default charging timing, which can adjust the charging timing of the light emitting modules 100, so as to achieve the display brightness of the light emitting modules 100 being the same and improving the brightness uniformity of the display panel.

Figure 6:
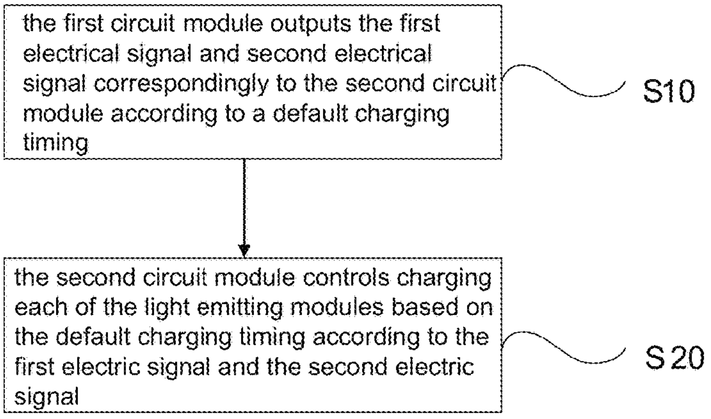
FIG. 6 is a schematic block diagram of a flowchart of a method for driving a display unit according to an embodiment of the disclosure.

According to the above object of the disclosure, this embodiment further provides a driving method of a display panel. Referring to FIG. 6, a schematic block diagram of a flowchart of a method for driving a display unit according to an embodiment of the disclosure is shown.

The display panel includes a display unit 10 and a driving circuit. The display unit 10 includes a plurality of light emitting modules 100. The driving circuit includes a first circuit module 30 and a second circuit module 20, the second circuit module 20 is electrically connected to the first circuit module 30 and the display unit 10, respectively.

The method for driving the display unit includes the following steps.

In a step S10, the first circuit module 30 outputs the first electrical signal CTL and second electrical signal FLK correspondingly to the second circuit module 20 according to a default charging timing.

In a step S20, the second circuit module 20 controls charging each of the light emitting modules 100 based on the default charging timing according to the first electric signal CTL and the second electric signal FLK, so that the display brightness of each light emitting module 100 is the same.

It should be noted that in this embodiment, the plurality of light emitting modules 100 comprise at least one target light emitting module. The default charging timing is an actual charging timing of the target light emitting module under a test data signal, and a brightness value of the target light emitting module under the test data signal is less than or equal to a brightness value of any of the light emitting modules under the test data signal. The actual charging timing of the target light emitting module under the test data signal is set as the default charging timing, which can adjust the charging timing of the light emitting modules 100, so as to achieve the display brightness of the light emitting modules 100 being the same and improving the brightness uniformity of the display panel.

Referring to FIG. 3 and FIG. 4, in this embodiment, in one displaying frame period of the display panel, the default charging timing comprises at least a first charging period t1, a second charging period t2 and a third charging period t3. The second circuit module 20 includes a scanning signal adjustment output module 23, a first adjustment sub-module 21, and a second adjustment sub-module 22. The second circuit module 20 has been described in detail in the above-mentioned embodiments and will not be repeated herein.

In this embodiment, the step S20 includes the first charging period t1.

The first electrical signal CTL changes from the first low level signal segment to the first high level signal segment, the first level identification module controls the conduction of the first control switch element M1 to adjust the first scanning signal which is outputted by the scanning signal adjustment output module 23 and corresponds to the first charging period t1.

Besides, the first electrical signal CTL further comprises by adjusting the resistance value of the first resistor Rd, the voltage signal output by the first built-in power source V0 of the first adjustment sub-module 21 can be adjusted, thereby adjusting the scanning signal adjustment output module 23 to output the first scanning signal corresponding to the first charging period t1.

The step S20 further includes the second charging period t2. When the first electrical signal CTK is the second high level signal segment and the second electrical signal FLK is the third high level signal segment, the second control switch element M2 and the third control switch element M3 are both turned on. The second control switch element M2 and the third control switch element M3 receive and are based upon the voltage of the second built-in power source V1 to switch the conduction state of the first adjustment switching element T1. The scanning signal adjustment output module 23 outputs the second scanning signal to the display unit 10 through the first adjustment switch element T1. The second scanning signal is a scanning signal with a high potential VGH.

Besides, the second charging period t2 further includes: controlling the charging time of the second scanning signal by adjusting the second electrical signal FLK.

The step S20 further includes the third charging period t3. The first electrical signal CTL is the second high level signal segment, and the second electrical signal FLK changes from the third high level signal segment to the second low level signal segment, and the fourth control switch element M4 and the fifth control switch element M5 are both turned on. The fourth control switch element M4 and the fifth control switch element M5 receive and are based on the voltage of the third built-in power source V2 to switch the conduction state of the second adjustment switch element T2. The scanning signal adjustment output module 23 outputs the third scanning signal to the display unit 10 through the second adjustment switch element T2.

Besides, the third charging period t3 further includes: by adjusting the resistance value of the second resistor RE, the scanning signal adjustment output module 23 can be adjusted to output the third scanning signal corresponding to the third charging period t3.

In this embodiment, the default charging timing further includes a discharging period t4. It should be noted that the first charging period t1, the second charging period t2, the third charging period t3 and the discharging period t4 are continuous time periods.

The step S20 further includes the discharging period t4. The first electrical signal CTL is the third low level signal segment and the second electrical signal FLK is the second low level signal segment. The sixth control switch element M6 and the seventh control switch element M7 are turned on. The sixth control switch element M6 and the seventh control switch element M7 receive and are based on the voltage of the fourth built-in power source V3 to switch the conduction state of the third adjustment switch element T3. The scanning signal adjustment output module 23 outputs the fourth scanning signal to the display unit 10 through the third adjustment switch element T3. The fourth scanning signal is a scanning signal with a low potential VGL.

In this embodiment, the second electrical signal FLK, the first resistor Rd, and the second resistor RE are adjusted to adjust the charging timing of a plurality of the light emitting modules 100, so that the charging timing of the light emitting modules 100 at the proximal end and distal end of the display panel is the same. That is to say, the charging time of each of the light emitting modules 100 on the display panel is the same, so that the display brightness of each light emitting module 100 is the same, and the brightness uniformity of the display panel is improved.

This embodiment further provides a display device, which includes the display panel in the first embodiment.

The display panel has been described in detail in the above embodiments, and will not be repeated herein.

As mentioned above, the application provides a display panel and a display device. The display panel comprises a display unit. The display unit comprises a plurality of light emitting modules, and a driving circuit electrically connected with the display unit and driving the display unit. The driving circuit comprises a first circuit module and a second circuit module. The second circuit module is electrically connected to the first circuit module and the display unit, respectively. The first circuit module outputs a first electrical signal and a second electrical signal correspondingly to the second circuit module according to a default charging timing, and the second circuit module controls charging each of the light emitting modules based on the default charging timing according to the first electric signal and the second electric signal. Therefore, the display brightness of each of the light emitting modules is the same, thereby improving the charging uniformity of the display panel and enhancing the display effect of the display panel.

In the above embodiments, the description of each embodiment has its own emphasis. For the parts not detailed in one embodiment, please refer to the relevant description of other embodiments.

It can be understood that, for those of ordinary skill in the art, equivalent replacements or changes can be made according to the technical solution of the present application and its inventive concept, and all these changes or replacements shall fall within the protection scope of the appended claims of the present application.

What is claimed is:

1. A display panel, comprising:

a display unit comprising a plurality of light emitting modules;

a driving circuit electrically connected with the display unit and driving the display unit, wherein the driving circuit comprises a first circuit module and a second circuit module, and the second circuit module is electrically connected to the first circuit module and the display unit, respectively;

wherein the first circuit module outputs a first electrical signal and a second electrical signal correspondingly to the second circuit module according to a default charging timing, and the second circuit module controls charging each of the light emitting modules based on the default charging timing according to the first electric signal and the second electric signal.

2. The display panel according to claim 1, wherein in one displaying frame period of the display panel, the default charging timing comprises at least a first charging period, a second charging period and a third charging period, and the second circuit module comprises:

a scanning signal adjustment output module electrically connected to the display unit;

a first adjustment sub-module electrically connected to the first circuit module and the scanning signal adjustment output module, respectively, wherein the first adjustment sub-module receives and is based upon the first electrical signal to adjust a first scanning signal outputted by the scanning signal adjustment output module corresponding to the first charging period; and a second adjustment sub-module electrically connected to the first circuit module and the scanning signal adjustment output module, respectively, wherein the second adjustment sub-module receives and is based upon the first electrical signal and the second electrical signal to adjust a second scanning signal and a third scanning signal which are outputted by the scanning signal adjustment output module and correspond to the second charging period and the third charging period.

3. The display panel according to claim 2, wherein the first adjustment sub-module comprises:

a first built-in power source;

a first control switch element, wherein one closed terminal of the first control switch element is electrically connected to the scanning signal adjustment output module, and the other closed terminal of the first control switch element is electrically connected to the first built-in power source;

a voltage dividing element connected in series to the first built-in power source; and a first level identification module electrically connected to the first circuit module and a control terminal of the first control switch element, respectively, wherein the first level identification module receives and is based upon the first electrical signal to switch a conduction state of the first control switch element to adjust the first scanning signal which is outputted by the scanning signal adjustment output module and corresponds to the first charging period.

4. The display panel according to claim 3, wherein the first electrical signal includes a first low level signal segment and a first high level signal segment corresponding to the first charging period, the first level identification module is configured to receive the first electrical signal and determine whether the first electrical signal changes from the first low level signal segment to the first high level signal segment; and wherein when the first electrical signal changes from the first low level signal segment to the first high level signal segment, the first level identification module controls the conduction of the first control switch element to adjust the first scanning signal which is outputted by the scanning signal adjustment output module and corresponds to the first charging period.

5. The display panel according to claim 3, wherein the voltage dividing element comprises at least one first resistor, one end of the first resistor is connected to the first built-in power source, and the other end of the first resistor is connected to a grounding end.

6. The display panel according to claim 2, wherein the scanning signal adjustment output module comprises:

an output main circuit connected to the first adjustment sub-module;

a first adjustment switch element, wherein one closed terminal of the first adjustment switch element is connected to the output main circuit, the other closed terminal of the first adjustment switch element is input with a high potential signal, and a control terminal of the first adjustment switch element is connected to the second adjustment sub-module;

a second adjustment switch element, wherein one closed terminal of the second adjustment switch element is connected to the output main circuit, the other closed terminal of the second adjustment switch element is input with a first voltage, and a control terminal of the second adjustment switch element is connected to the second adjustment sub-module; and a shunt element connected to the second adjustment switch element in series;

wherein the second adjustment sub-module receives and is based upon the first electrical signal and the second electrical signal to switch a conduction state of the first adjustment switch element and the second adjustment switch element to adjust the second scanning signal and the third scanning signal which are outputted by the scanning signal adjustment output module and correspond to the second charging period and the third charging period.

7. The display panel according to claim 6, wherein the shunt element comprises at least one second resistor, one end of the second resistor is connected to the first power source, and the other end of the second resistor is electrically connected to the second adjustment switch element.

8. The display panel according to claim 6, wherein the first electrical signal comprises a second high level signal segment corresponding to the second charging period and the third charging period, the second electrical signal comprises a third high level signal segment corresponding to the second charging period, and a second low level signal segment corresponding to the third charging period;

when the first electrical signal is the second high level signal segment and the second electrical signal is the third high level signal segment, the second adjustment sub-module controls the conduction of the first adjustment switch element to adjust the second scanning signal which is outputted by the scanning signal adjustment output module and corresponds to the second charging period;

when the first electrical signal is the second high level signal segment and the second electrical signal changes from the third high signal segment to the second low level signal segment, the second adjustment sub-module controls the conduction of the second adjustment switch element to adjust the third scanning signal which is outputted by the scanning signal adjustment output module and corresponds to the third charging period.

9. The display panel according to claim 8, wherein the second adjustment sub-module comprises:

a second built-in power source;

a second control switch element, wherein a control terminal of the second control switch element is electrically connected to the first circuit module, one closed terminal of the second control switch element is electrically connected to the control terminal of the first adjustment switch element, and the other closed terminal of the second control switch element is electrically connected to the second built-in power source; and a third control switch element, wherein a control terminal of the third control switch element is electrically connected to the first circuit module, one closed terminal of the third control switch element is electrically connected to the control terminal of the first adjustment switch element, the other closed terminal of the third control switch element is electrically connected to the second built-in power source, and the third control switch element is connected in series to the second control switch element;

wherein when the first electrical signal is the second high level signal segment and the second electrical signal is the third high level signal segment, the second control switch element and the third control switch element are both turned on, the second control switch element and the third control switch element receive and are based upon a voltage of the second built-in power source to switch the conduction state of the first adjustment switching element to adjust the second scanning signal which is outputted by the scanning signal adjustment output module and corresponds to the second charging period.

10. The display panel according to claim 8, wherein the second adjustment sub-module comprises:

a third built-in power source;

a fourth control switch element, wherein a control terminal of the fourth control switch element is electrically connected to the first circuit module, one closed terminal of the fourth control switch element is electrically connected to the control terminal of the second adjustment switch element, and the other closed terminal of the fourth control switch element is electrically connected to the third built-in power source;

a fifth control switch element, wherein one closed terminal of the fifth control switch element is electrically connected to the control terminal of the second adjustment switch element, and the other closed terminal of the fifth control switch element is electrically connected to the third built-in power source, and the fifth control switch element is connected in series to the fourth control switch element; and a second level identification module respectively connected to the first circuit module and a control terminal of the fifth control switch element, wherein the second level identification module receives and is based upon the second electrical signal and switches the conduction state of the fifth control switching element;

wherein when the first electrical signal is the second high level signal segment and the second electrical signal changes from the third high level signal segment to the second low level signal segment, the fourth control switch element and the fifth control switch element are turned on, the fourth control switching element and the fifth control switching element receive and are based upon a voltage of the third built-in power source to switch the conduction state of the second adjustment switching element to adjust the third scanning signal which is outputted by the scanning signal adjustment output module and corresponds to the third charging period.

11. The display panel according to claim 8, wherein the default charging timing further comprises a discharging period, and the scanning signal adjustment output module further comprises:

a third adjustment switch element, wherein one closed terminal of the third adjustment switch element is connected to the output main circuit, the other closed terminal of the third adjustment switch element is input with a low potential signal, and a control terminal of the third adjustment switch element is connected to the second adjustment sub-module;

wherein the second adjustment sub-module receives and is based upon the first electrical signal and the second electrical signal, to switch a conduction state of the third adjustment switch element to adjust a fourth scanning signal which is output by the scanning signal adjustment output module and corresponds to the discharging period.

12. The display panel according to claim 11, wherein the first electrical signal further comprises a third low level signal segment corresponding to the discharging period, and the second adjustment sub-module comprises:

a fourth built-in power source;

a sixth control switch element, wherein a control terminal of the sixth control switch element is electrically connected to the first circuit module, and one closed terminal of the sixth control switch element is electrically connected to the control terminal of the third adjustment switch element, the other closed terminal of the sixth control switch element is electrically connected to the fourth built-in power source;

a seventh control switch element, wherein the control terminal of the seventh control switch element is electrically connected to the first circuit module, and one closed terminal of the seventh control switch element is electrically connected to the control terminal of the third adjustment switch element, the other closed terminal of the seventh control switch element is electrically connected to the fourth built-in power source, and the seventh control switch element is connected in series to the sixth control switch element;

wherein when the first electrical signal is the third low level signal segment and the second electrical signal is the second low level signal segment, the sixth control switch element and the seventh control switch element are both turned on, the sixth control switch element and the seventh control switch element receive and are based upon a voltage of the fourth built-in power source to switch the conduction state of the third adjustment switch element to adjust the fourth scanning signal which is output by the scanning signal adjustment output module and corresponds to the discharging period.

13. The display panel according to claim 1, wherein the plurality of light emitting modules comprise at least one target light emitting module; and wherein the default charging timing is an actual charging timing of the target light emitting module under a test data signal, and a brightness value of the target light emitting module under the test data signal is less than or equal to a brightness value of any of the light emitting modules under the test data signal.

14. A display device, comprising a display panel, wherein the display panel comprises:

a display unit comprising a plurality of light emitting modules;

a driving circuit electrically connected with the display unit and driving the display unit, wherein the driving circuit comprises a first circuit module and a second circuit module, and the second circuit module electrically connected to the first circuit module and the display unit, respectively;

wherein the first circuit module outputs a first electrical signal and a second electrical signal correspondingly to the second circuit module according to a default charging timing, and the second circuit module controls charging each of the light emitting modules based on the default charging timing according to the first electric signal and the second electric signal.

15. The display device according to claim 14, wherein in one displaying frame period of the display panel, the default charging timing comprises at least a first charging period, a second charging period and a third charging period, and the second circuit module comprises:

a scanning signal adjustment output module electrically connected to the display unit;

a first adjustment sub-module electrically connected to the first circuit module and the scanning signal adjustment output module, respectively, wherein the first adjustment sub-module receives and is based upon the first electrical signal to adjust a first scanning signal outputted by the scanning signal adjustment output module corresponding to the first charging period; and a second adjustment sub-module electrically connected to the first circuit module and the scanning signal adjustment output module, respectively, wherein the second adjustment sub-module receives and is based upon the first electrical signal and the second electrical signal to adjust a second scanning signal and a third scanning signal which are outputted by the scanning signal adjustment output module and correspond to the second charging period and the third charging period.

16. The display device according to claim 15, wherein the first adjustment sub-module comprises:

a first built-in power source;

a first control switch element, wherein one closed terminal of the first control switch element is electrically connected to the scanning signal adjustment output module, and the other closed terminal of the first control switch element is electrically connected to the first built-in power source;

a voltage dividing element connected in series to the first built-in power source; and a first level identification module electrically connected to the first circuit module and a control terminal of the first control switch element, respectively, wherein the first level identification module receives and is based upon the first electrical signal to switch a conduction state of the first control switch element to adjust the first scanning signal which is outputted by the scanning signal adjustment output module and corresponds to the first charging period.

17. The display device according to claim 16, wherein the first electrical signal includes a first low level signal segment and a first high level signal segment corresponding to the first charging period, the first level identification module is configured to receive the first electrical signal and determine whether the first electrical signal changes from the first low level signal segment to the first high level signal segment; and wherein when the first electrical signal changes from the first low level signal segment to the first high level signal segment, the first level identification module controls the conduction of the first control switch element to adjust the first scanning signal which is outputted by the scanning signal adjustment output module and corresponds to the first charging period.

18. The display device according to claim 16, wherein the voltage dividing element comprises at least one first resistor, one end of the first resistor is connected to the first built-in power source, and the other end of the first resistor is connected to a grounding end.

19. The display device according to claim 15, wherein the scanning signal adjustment output module comprises:

a output main circuit connected to the first adjustment sub-module;

a first adjustment switch element, wherein one closed terminal of the first adjustment switch element is connected to the output main circuit, the other closed terminal of the first adjustment switch element is input with a high potential signal, and a control terminal of the first adjustment switch element is connected to the second adjustment sub-module;

a second adjustment switch element, wherein one closed terminal of the second adjustment switch element is connected to the output main circuit, the other closed terminal of the second adjustment switch element is input with a first voltage, and a control terminal of the second adjustment switch element is connected to the second adjustment sub-module; and a shunt element connected to the second adjustment switch element in series;

wherein the second adjustment sub-module receives and is based upon the first electrical signal and the second electrical signal, to switch a conduction state of the first adjustment switch element and the second adjustment switch element to adjust the second scanning signal and the third scanning signal which are outputted by the scanning signal adjustment output module and correspond to the second charging period and the third charging period.

20. The display device according to claim 19, wherein the shunt element comprises at least one second resistor, one end of the second resistor is connected to the first power source, and the other end of the second resistor is electrically connected to the second adjustment switching element.

* * * * *